Sept. 13, 1960 E. B. BREITKREUTZ 2,952,031
FOWL RESTRAINING DEVICES
Filed Feb. 14, 1958

INVENTOR
Emma B. Breitkreutz
BY
ATTORNEY

United States Patent Office 2,952,031
Patented Sept. 13, 1960

2,952,031

FOWL RESTRAINING DEVICES

Emma B. Breitkreutz, 62 Summit Ave., St. Paul, Minn.

Filed Feb. 14, 1958, Ser. No. 715,337

5 Claims. (Cl. 17—11)

This invention relates to an improvement in fowl restraining devices and is particularly designed for use in confining chickens, turkeys and other fowl as they are killed.

Various means have been provided for killing fowl prior to dressing them for table use. Many such devices are not particularly practical for use by farmers and fowl raisers due to their high cost and complicated nature. It is an object of the present invention to provide a simple device capable to restraining the fowl into a certain position during the killing operation to avoid the difficulties previously experienced in an operation of this type.

An object of the present invention resides in the provision of a restraining cage mounted upon a base board and of sufficient size to contain the fowl to be killed. This cage is provided with relatively small openings at opposite ends through which the feet of the fowl and the head of the fowl may extend. The cage is hingedly connected to the backing board so that it may be swung down quickly over the body of the fowl after it has been placed upon the table. The legs of the fowl extend through one of the small openings at one end of the cage and may be quickly clamped down against the mounting bracket. The neck of the fowl extends through the small opening in the other end of the cage and clamping means is provided for holding the neck and legs in place.

A feature of the present invention resides in the provision of a cage which is of largest dimensions at the center and of smaller dimensions at the end so as to fit about the body of the fowl when in place therein. When the fowl is caught, it is usually grasped by the legs and carried in an inverted position to the table. As the fowl is swung onto the table, the cage is swung down in such a manner that the legs extend through the small opening in one end and the neck extends through the small opening in the other end. The cage is secured in this position while the legs and neck of the fowl are further clamped in place. The knife blade is then lowered and the operation is complete.

A further feature of the present invention resides in the simplicity of construction. The device includes a simple frame work which may be constructed of strips or wires bent into the proper shape and spot welded together. Hinges are connected to one side of the cage and hooks or other clamping means are secured to the opposite side thereof. A pair of simple hinged clamps are mounted on the base board at opposite ends of the cage and the knife is preferably pivotally supported on the base board to swing down between an end of the cage and one of the clamping members. Because of the simple design, the apparatus can be constructed economically and sold at low cost. Where more than one type of fowl is to be killed, cages of different sizes may be employed. If desired, one size of cage may be substituted for another. However, if preferred, different boards and units may be employed for fowl of different sizes due to the inexpensiveness of the apparatus.

These and other objects and novel features of the present invention will be more clearly and fully set forth in the following specification and claims.

In the drawings forming a part of the specification:

Figure 1:
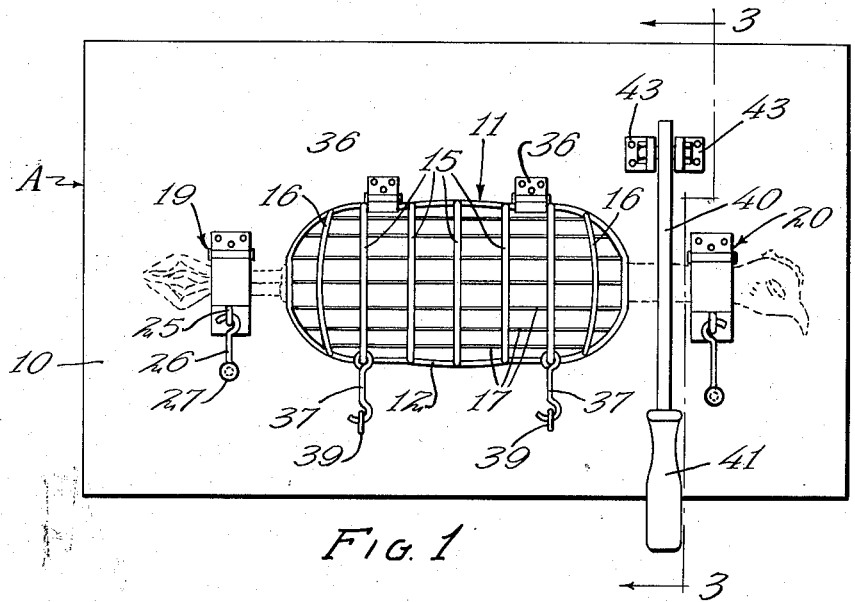
Figure 1 is a top plan view of the apparatus in readiness for operation.

The fowl killing unit is indicated in general by the letter A. Obviously the details of construction may be varied to some extent, the arrangement illustrated being typical of one such construction. The apparatus A includes a base board or table 10 having a cage 11 hingedly attached thereto. The cage 11 preferably includes a base frame member 12 which is generally oval shaped in form and which is on a common plane with the exception of end arches 13 and 14 at the ends of the cage or along the principal axis of the oval. A series of substantially semi-circular frame members 15 extend upwardly from the base frame member 12 with the lower ends of the semi-circular frame members spot welded or otherwise connected to opposite sides of the frame member 12. A pair of substantially semi-circular wire hoops 16 of smaller radius than the hoops 15 bridge the converging ends of the oval frame member 12 near the ends of this member. The arches 15 and 16 are in generally parallel relation.

In order to hold the various arches 15 and 16 in proper relationship, I provide a series of connecting wires or strips 17 which intersect the arches 15 and 16 at substantially right angles and which are preferably connected at their ends to the frame member 12. In other words, these right angular frame members 17 also usually comprise elongated arches which are terminally connected to the base frame member 12 and which are spot welded or otherwise secured to the various arches 15 and 16 which they intersect. Thus, the members 16 and 17 form a wire network which is inexpensive to construct and which will effectively confine the body of a fowl.

Clamping members 19 and 20 which may be of identical form are secured to the base board or table 10 in longitudinally spaced relation to the cage 11. The clamping member 19 as shown in Figure 2 includes a mounting plate 21 which is hingedly connected at 22 to an arch strap 23 having a central portion in substantially spaced parallel relation to the upper surface of the base board 10. The end of the arch strap 23 opposite the hinged side thereof includes a flange 24 which rests upon the surface of the board 10 and is provided with a U-shaped loop 25 extending upwardly therefrom. As indicated in Figure 1 of the drawings, a hook 26 is pivotally connected to the board 10 along a substantially vertical pivot by means of a headed fastening member 27 and may be swung into or out of engagement with the loop 25.

Figure 4:
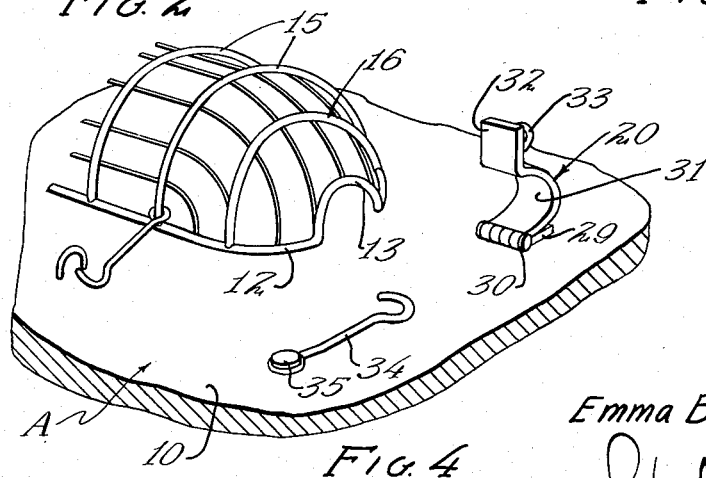
Figure 4 is a perspective view of one of the clamps and the adjoining end of the cage.

The clamp 20 is virtually identical with the clamp 19 except that preferably the intermediate portion of the clamp is arcuate rather than flat. As indicated in Figure 4 of the drawings, the clamp 20 includes an anchoring plate 29 which is hingedly connected at 30 to an arcuate clamping member 31 having a bearing flange 32 at its end and designed to rest upon the base board 10 in clamping position. An inverted U-shaped loop 33 has its ends anchored to the flange 32 and projects upwardly therefrom. A hook 34 is pivotally connected along a substantially vertical pivot by a headed member 35 extending into the base board 10. The hook 34 is swingable through the loop 33 to hold the clamping member 20 in clamping position.

Figures 2, 3:
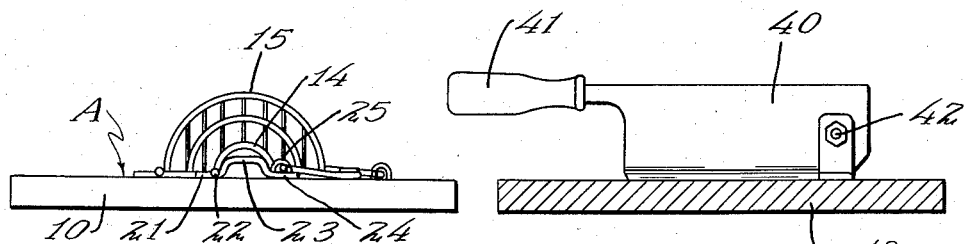
Figure 2 is an end elevational view of the apparatus with the knife omitted to simplify the showing.
Figure 3 is an elevational view of the knife, the view being taken on the line 3—3 of Figure 1.

As is best indicated in Figure 1 of the drawings, the cage like member 11 is connected to the base board 10 by means of a pair of spaced aligned hinges 36 which are connected to one edge of the base ring 12. Hooks 37 are pivotally secured to the other side of the frame 11 and are engageable with inverted U-shaped loops or hasps 39 extending into the base board. Thus the cage is held by the hooks 37 in closed position when the apparatus is in use.

A knife blade 40 having a handle 41 at one end thereof is pivotally secured at 42 between a pair of angle brackets 43 so as to swing in a substantially vertical plane. The knife 42 may swing down into surface contact with the base board 10 between the cage member 11 and the clamping member 20. The knife blade 40 is designed to sever the neck of the fowl being held.

The operation of the apparatus is believed apparent from the description of the construction thereof. The fowl is grasped by the legs and swung into position upon the board 10 with the body of the fowl adjoining the cage 11 which has been swung upwardly into open position. The cage 11 is swung down so that the neck of the fowl extends through the loop 13 at one end of the cage and the legs of the fowl extend through the loop 14 at the opposite end thereof. The clamps 19 and 20 are swung down and locked into place overlying the legs and neck of the fowl. The knife blade 40 is next swung downwardly, instantly severing the neck of the fowl while it is confined in the cage. The cage 11 as well as the clamps 19 and 20 are next swung into open position and the device is ready for reuse.

In accordance with the patent statutes, I have described the principles of construction and operation of my improvement in fowl restraining devices, and while I have endeavored to set forth the best embodiment thereof, I desire to have it understood that changes may be made within the scope of the following claims without departing from the spirit of my invention.

I claim:

1. A fowl restraining device including a flat base board, an upwardly bowed hollow cage pivotally supported to said base board along one edge thereof, said cage having an open side which is closed by said base board when said cage is swung down into contact therewith, said cage having opposed openings therethrough communicating with said open side and through which the neck and legs of a fowl may extend, said cage fitting said fowl snugly enough to restrain the fowl from extensive movement when said cage is in closed position, and clamping means in spaced relation to one of said openings and hingedly supported for movement into and out of clamping position against said base board.

2. The structure described in claim 1 and including a second clamping means hingedly supported upon said base board into and out of clamping position against said base board and positioned adjoining the other of said openings in said cage.

3. A fowl restraining device comprising a flat base board table, an enclosure having an oval shaped base member and an upwardly extending cage which is substantially semi-circular in cross-section, means hingedly connecting one side of said enclosure to said base board table and means releasably connecting the opposite side of said enclosure to said table, said base member having arched ends at each end thereof along the principal axis of said oval shaped base member, a clamp substantially semi-circular in cross section, means hingedly connecting said clamp in spaced aligned relation to one end of said enclosure to said base board, and means releasably holding said clamp against said base board table.

4. The structure of claim 3 and including a knife hingedly secured to said base board table and swingable thereagainst between said one end of said enclosure and said clamp.

5. The structure of claim 3 and including a second clamp hingedly secured to said base board table in spaced aligned relation to the other end of said enclosure.

References Cited in the file of this patent

UNITED STATES PATENTS

| 433,151 | Schonemann | July 29, 1890 |
| 933,817 | Beatty | Sept. 14, 1909 |
| 2,051,989 | Ellis | Aug. 25, 1936 |

FOREIGN PATENTS

| 7,898 | Great Britain | 1900 |